United States Patent [19]

Curatolo et al.

[11] Patent Number: 4,725,666

[45] Date of Patent: Feb. 16, 1988

[54] PROCESS FOR THE MANUFACTURE OF POLYAMIDE FROM DIAMINE AND DINITRILE UTILIZING (1) COPPER CONTAINING COMPOUND AND (2) OXYGEN CONTAINING COMPOUND OF PHOSPHORUS OR SULFUR AS CATALYST MIXTURE

[75] Inventors: Benedict S. Curatolo, Maple Heights; Robert C. Sentman, Macedonia; Gerald P. Coffey, Lyndhurst, all of Ohio

[73] Assignee: The Standard Oil Company, Cleveland, Ohio

[21] Appl. No.: 871,359

[22] Filed: Jun. 6, 1986

[51] Int. Cl.[4] ............................................. C08G 69/28

[52] U.S. Cl. ...................................... 528/336; 528/310; 528/313; 528/319; 528/323; 528/335; 528/347

[58] Field of Search .................... 528/336, 313, 319

[56] References Cited

U.S. PATENT DOCUMENTS 4,490,521 12/1984 Coffey et al. ...................... 528/336

*Primary Examiner*—Harold D. Anderson
*Attorney, Agent, or Firm*—David P. Yusko; John E. Miller; Larry W. Evans

[57] ABSTRACT

Polyamides are produced from diamines, dinitriles, and water in contact with a two-component catalyst system comprising (1) at least one copper containing compound and (2) at least one oxygen containing compound of phosphorus or sulfur.

15 Claims, No Drawings

PROCESS FOR THE MANUFACTURE OF POLYAMIDE FROM DIAMINE AND DINITRILE UTILIZING (1) COPPER CONTAINING COMPOUND AND (2) OXYGEN CONTAINING COMPOUND OF PHOSPHORUS OR SULFUR AS CATALYST MIXTURE

BACKGROUND OF THE INVENTION

1. Field of the Invention

This invention relates to polyamides. In one aspect, the invention relates to a process for manufacturing polyamides from an $\alpha,\omega$-dinitrile and an $\alpha,\omega$-diamine while in another aspect, the invention relates to a process utilizing a two component catalyst system wherein the first component is a copper containing compound and the second compound is an oxygenated compound of phosphorus or sulfur. For example, the invention relates to an improved process for manufacturing nylon-6,6 from adiponitrile and hexamethylene diamine utilizing a two component catalyst system composed of a mixture of copper chloride and phosphorous acid.

2. Description of the Prior Art

The art is replete with references describing various methods for preparing commercially available nylons from diamines and dicarboxylic acids. The art also contains teachings for preparing nylons from diamines and dinitriles. For example, U.S. Pat. No. 2,245,129 by Greenwalt describes a method for producing a linear polyamide by heating a reaction mixture of a dinitrile, a diamine and water. The procedure consists of two stages. In the first stage, the reaction mixture is heated in a closed reaction vessel until a low molecular weight polyamide is formed while in the second stage, this low molecular weight polyamide is converted to a high molecular weight polyamide upon additional heating.

U.S. Pat. No. 3,847,876 by Onsager teaches another method for preparing a high molecular weight polyamide comprising contacting a dinitrile, a diamine and water. The Onsager process requires at least equal molar amounts of diamine and dinitrile to be initially present in the reaction mixture and further requires that the polymerization occur in the presence of controlled amounts of ammonia, preferably in the presence of at least three weight percent based on the total weight of the diamine, dinitrile and water. This generally entails addition of ammonia to the reaction mixture over the course of the reaction.

Hoffmann et al., in U.S. Pat. No. 4,436,895, disclose an improved method for preparing a high molecular weight polyamide from a dinitrile, diamine and water by conducting the polymerization in the presence of one of (1) an oxygen-containing phosphorus compound, (2) an oxygen-containing boron compound, (3) acidic oxygen-containing sulfur compounds and (4) hydrogen halide and ammonium or ammonium alkyl salts thereof. This process reduces the conventional reaction time of the polymerization and produces a high molecular weight, linear polyamide having desirable weight loss spinning properties.

Improvements to the Hoffmann et al. catalysts were patented by Coffey et al., in U.S. Pat. No. 4,490,521. This patent discloses a method for the improvement of resin thermal stability through the use of metal salts of oxyphosphorus acids, such as disodium phosphite, as the catalyst.

While all of the above methods and others known in the art demonstrate utility for manufacturing linear polyamides, the nylon fiber industry continues to seek manufacturing improvements which result in superior quality polyamide. Of particular interest are process improvements which will result in reduced operation cost and the corresponding increase in operation efficiency.

SUMMARY

The invention is a process for manufacturing a polyamide from an $\alpha,\omega$-dinitrile, an $\alpha,\omega$-diamine and water in contact with a catalyst, the contacting conducted at an elevated temperature and pressure, wherein the catalyst comprises (1) at least one copper containing compound and (2) at least one oxygen-containing compound of phosphorus or sulfur. The polyamide produced by this process in a given time is of higher molecular weight than that produced using either component of the catalyst mixture alone, allowing for shorter cycle times and the use of lower catalyst concentrations.

DETAILED DESCRIPTION OF THE INVENTION

Monomers

The $\alpha,\omega$-diamines here used are of the formula

$$R'HN-R-NHR' \qquad (I)$$

where R is a divalent organic radical and each R' is independently hydrogen or a univalent organic radical. R can be a divalent aliphatic, alicyclic or aromatic radical and these radicals can bear one or more inert substituents. Similarly, each R' can be independently a hydrogen or a univalent aliphatic, alicyclic or aromatic radical and each one of these radicals can also bear one or more inert substituents. By the term "inert" is meant that the substituent is essentially nonreactive with the reactants, catalysts and products of the process under process conditions. Typically, R is a divalent $C_1$–$C_{20}$ aliphatic radical, a divalent $C_5$–$C_{18}$ alicyclic radical, or $C_6$–$C_{12}$ divalent aromatic or aromatic containing radical, and preferably R is a $C_2$–$C_8$ straight chain alkylene radical. Typically, R' is hydrogen or a $C_1$–$C_{20}$ aliphatic radical, $C_5$–$C_7$ alicyclic or a phenyl radical. Preferably, R' is hydrogen or a $C_1$–$C_4$ alkyl radical. Representative diamines include tetramethylene diamine, hexamethylene diamine, p-diaminodicyclohexylmethane, 4,4'-diaminodicyclohexyl ether, 4,4'-diaminodicyclohexyl sulfide, 4,4'-diaminodicyclohexyl sulfone, octamethylene diamine, decamethylene diamine, dodecamethylene diamine, meta-xylylene diamine, 1,4-dimethyleneamino-1-phenyl-1,2,3,4-tetrahydronaphthalene and the like. Hexamethylene diamine is an especially preferred diamine.

The dinitriles here used are of the formula

$$NC-R-CN \qquad (II)$$

where R is as previously defined. Representative dinitriles include glutaronitrile, succinonitrile, adiponitrile, suberonitrile, isophthalonitrile, sebaconitrile, 1,10-decane dinitrile, methyl glutaronitrile, $\alpha$-methylene glutaronitrile, 1,4-dicyano-1-phenyl-1,2,3,4-tetrahydronaphthalene and the like. Adiponitrile is an especially preferred nitrile.

The instant invention is substantially aimed at the production of polyamides from diamines and dinitriles. However, other polyamides can also be prepared by the instant process by the polymerization of a major proportion of diamines and dinitriles with minor proportions of other polyamide forming compounds. Representatives of other polyamide forming compounds are (1) lactams, such as caprolactam, valerolactam, undecalactam; (2) amino carboxylic acids; (3) aliphatic and aromatic dicarboxylic acids, such as adipic acid, succinic acid, sebacic acid, isophthalic acid and terephthalic acid; and (4) aliphatic and aromatic diamides, such as malonamide, glutaramide, succinamide, adipamide, terephthalamide and isophthalamide.

The Catalyst System

The hallmark of this invention is the use of a two component catalyst system comprising (1) at least one copper containing compound and (2) at least one oxygen-containing compound of phosphorus or sulfur. The mixture is a more efficient catalyst than either component used alone.

Any copper compound may be used as a catalyst in the instant invention. The copper may be in any oxidation state without affecting the reaction rate. Best results are obtained if the copper compound is soluble in the reaction mixture, as better contact between the reactants and the catalytic site can then occur. Representative of the copper compounds suitable for use as catalysts in this invention are copper halides, such as $CuCl_2$, CuI and CuBr, copper borates, copper carbonates, copper nitrate, copper (II) acetylacetonate and copper (III) acetylacetonate.

The oxygen-containing phosphorus compounds which are suitable for use in the invention include phosphorous acid; phosphonic acid; alkyl and aryl substituted phosphonic acid, hypophosphorous acid; alkyl, aryl and alkyl/aryl substituted phosphonic acid; and phosphoric acid; as well as the alkyl, aryl and alkyl/aryl esters, metal salts, ammonium salts, and ammonium alkyl salts of these various phosphorus containing acids. As used herein, "alkyl/aryl" refers to those combinations where there is more than one organic substituent. In the substituted acids, the alkyl or aryl group replaces the hydrogen connected directly to the phosphorus atom. The esters are formed conventionally with the alkyl or aryl group replacing the hydrogen of an —OH group comprising the acid. To clarify the nomenclature, the names of the acids are identified with the structural formulas as follows:

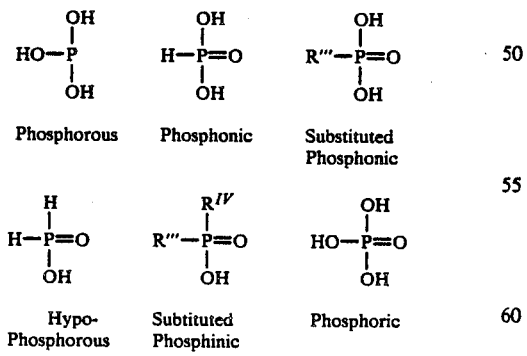

where $R'''$ is an alkyl or aryl or alkyl/aryl group and $R^{IV}$ is hydrogen or an alkyl or aryl group. In common usage, phosphonic acid shares the name phosphorous acid.

Preferred oxygen-containing phosphorus compounds are phosphorous acid, phosphoric acid, and the sodium, lithium or sodium/lithium dibasic salts of phosphorous or phosphoric acids. These salts may be added initially or generated in situ by the addition of NaOH or LiOH to a reaction mixture already containing the oxyphosphorus acid or a monobasic salt thereof at a time late in the reaction cycle.

The oxygen-containing sulfur compounds suitable for use as catalyst in the invention include sulfuric acid, sulfurous acid, sulfur dioxide, sulfur trioxide, alkyl and aryl substituted sulfonic acid, alkyl and aryl substituted sulfinic acid and alkyl and aryl substituted sulfenic acid; as well as the alkyl, aryl, and alkyl/aryl esters, metal salts, ammonium salts, ammonium alkyl salts of these various sulfur containing compounds. The esters are formed conventionally with the alkyl or aryl group replacing the hydrogen of an —OH group comprising the acid. Sulfoxides, sulfones, sulfates, pyrosulfates, sulfites, pyrosulfites, sulfonates and sulfinates are included in the oxygenated sulfur compounds suitable for use as catalysts in the invention.

In order to clarify some of the compounds named above, the structures of several of the oxygenated sulfur compounds are:

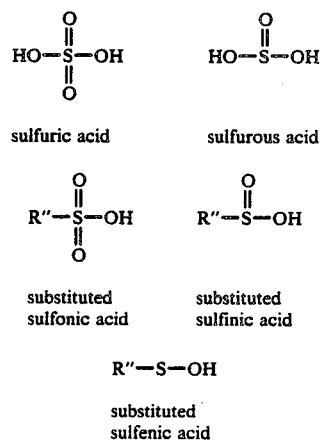

where each $R''$ is independently an alkyl or aryl radical.

Preferred oxygen-containing sulfur compounds are sulfuric acid, p-toluenesulfonic acid, and the sodium or lithium salts of sulfuric or p-toluenesulfonic acids. These salts may be added initially or generated in situ by the addition of NaOH or LiOH to a reaction mixture already containing the oxygenated sulfur compound at a time late in the reaction cycle.

The instant invention has been thus far described as a two component catalyst system. However, included within the scope of this invention are catalysts comprised of single compounds which contain copper and oxygen-containing anions of phosphorus or sulfur. Representative of such compounds are copper phosphates and copper sulfates.

Sufficient catalyst is employed to promote the polymerization of the diamine and dinitrile with a typical amount of between 0.001 and 1 weight percent, based upon the total weight of the diamine, dinitrile, and water. Catalyst levels of about 0.01 to about 1 weight percent are preferred.

Many ratios of the amount of copper to the total amount of phosphorus and sulfur will produce the desired results. Preferred ratios lie between 20:1 and 1:20, more preferred between 1:1 and 1:10, and most preferred between 1:1 and 1:5.

The manner in which the catalyst is added to the monomers can vary, e.g. addition of each component separately to a mixture of monomers or added as a mixture to one of the monomers prior to admixture with the other monomer.

While not being bound to theory, the hydrolysis of the dinitrile is believed to be accelerated by the copper component of the catalyst, and the oxygenated component accelerates the polycondensation of the product of hydrolysis with the diamine.

Process Parameters

High molecular weight, linear polyamides having desirable weight loss properties are prepared by forming a reaction mixture of the dinitrile, diamine, water and catalyst. This reaction mixture can be formed by any one of a number of different methods. One method is the gradual addition, either continuously or incrementally, of the diamine to the dinitrile over the course of the hydrolysis portion of the reaction (polymerization). Typically, in this method less than 50 mole percent of the diamine, preferably less than 5 mole percent, is admixed with the dinitrile with the remainder of the diamine added gradually over the course of polymerization. Another method and one preferred due to its simplicity of operation is a batch addition of all reactants at the commencement of the reaction.

The reaction itself is preferably conducted in a batch mode. However, the reaction can also be conducted in a continuous mode, i.e. continual addition of the reactants with concomitant removal of product, if desired. An example of a continuous mode process is the use of a cascade reactor arrangement.

Water is necessary to the process as both a reactant and as an aid in formation of the polyamide. Consequently, a stoichiometric excess of water is typically employed in the reaction mixture during the polymerization. This does not mean that a stoichiometric excess of water is present at all times during polymerization, it instead means that the total amount of water consumed by the polymerization plus the amount of water remaining at the end of the polymerization is in excess of the amount of water required for full polymerization of the monomers. Preferably the initial water content of the reaction mixture does not exceed about 25 weight percent of the total weight of the reaction mixture, more preferably it does not exceed 15 weight percent. Assuming less than or about 15 weight percent water is present at the start of the reaction, then as the polymerization proceeds additional water is gradually added to the reaction mixture until water constitutes about 20 weight percent of the mixture. Although it is not desired, more water can be used. However, since the water will have to be removed from the reaction product at the end of the polymerization, preferably the amount of excess water is kept to a minimum (20 weight percent or less) to facilitate ultimate removal. Moreover, the less water present during the polymerization generally means the less energy needed for the process and consequently, less expensive process equipment can be employed. The manner in which the water is initially introduced into the reaction mixture is not important to the practice of this invention and it can thus be either added alone or in combination with the dinitrile or diamine.

Ammonia is a byproduct of the reaction of the diamine, dinitrile and water. As a consequence, ammonia is constantly being generated within the reaction mixture but it typically enters the vapor phase and is preferably continuously removed from the reaction zone (e.g. released through a pressure relief valve on the reaction vessel). The concentration of ammonia in the reaction mixture (which is a liquid) can vary from threshold detection limits up to about 5 weight percent of the total weight of the reaction mixture. Preferably, the concentration of ammonia in the liquid reaction mixture does not exceed 1 weight percent and more preferably, is kept as low as possible.

In one embodiment of this invention, high quality nylon-6,6 resin is prepared from adiponitrile, hexamethylene diamine and water by continuously removing substantially all of the ammonia generated during the polymerization but while retaining all of the water. The water is eventually removed from the reaction system after the low molecular weight polyamides are formed, i.e. the hydrolysis of the dinitrile is essentially complete as evidenced, for example, by the amount of ammonia that has evolved since the start of the reaction.

As is well known in the art, e.g. U.S. Pat. No. 3,847,876, the polymerization of a diamine and a dinitrile to form a high molecular weight, linear polyamide is best conducted over a temperature/pressure profile that varies over the course of the polymerization. The temperature/pressure profile will, of course, vary with the specific reactants employed as well as with such factors as the nature and amount of catalysts, mode of operation (bath versus continuous), configuration of the reaction vessel, etc. For the manufacture of nylon-6,6 from adiponitrile, hexamethylene diamine and water, a temperature/pressure profile comprising at least two stages is typically employed, both preferably conducted in the absence of air ($O_2$). During the first stage of the polymerization, the temperature is maintained at 200°–300° C., preferably 240°–270° C., under autogenous pressure (typically about 200 to about 800 psi absolute) for a period of time sufficient to form low molecular weight polyamides, e.g. polyamides having a weight average molecular weight of less than about 10,000, generally less than about 5,000 as measured by intrinsic viscosity. Ammonia is removed from the reaction vessel while maintaining the water concentration at a level sufficient for polymerization to proceed, typically in excess of 14 weight percent. At the completion of the first stage (which is the start of the second stage), the pressure is gradually reduced to atmospheric or subatmospheric pressure and the temperature is gradually increased, preferably to between about 260°–295° C. During this second stage, relatively low molecular weight polyamides are combined to form the high molecular weight polyamides that constitute the final product of the process. The second stage is typically concluded with a sweep or purge of the reaction vessel with a flow of inert gas, such as nitrogen.

In one embodiment of this invention, the molecular weight of the polyamide can be increased by performing the polymerization at a temperature just below the lowest temperature at which either the catalyst, monomers or final polyamide begin to degrade.

Although the polymerization is initially conducted at autogenous pressure with a later reduction to atmospheric or subatmospheric pressure, the process can be conducted at constant pressure by applying pressure to the system and adjusting this pressure as the reaction proceeds. The pressure can be maintained with a gaseous reactant or a gas inert to the reaction or some combination of the two. However, since the reaction itself is conducted in the liquid phase, the presence of a gaseous reactant is for the purpose of maintaining reaction pressure, not for participating in the polymerization.

The Polyamide

The polyamides produced by this invention are solid Standard) screen. Melting point and onset decomposition temperature (ODT) was measured by differential scanning calorimetry (DSC). Weight loss was measured by thermal gravimetric analysis (TGA). Intrinsic viscosity was determined in formic acid (90 weight percent) at 25° C. Identification of catalysts and the results are reported in Table I.

TABLE I

| Example | Copper Compound | Oxygenated Compound | Cu Mole % | Oxygenated Compound Mole % | Intrinsic Viscosity | % TGA Wt. Loss 325–390° C. | DSC Onset Decomposition Temperature (°C.) |
|---|---|---|---|---|---|---|---|
| A | — | — | — | — | 0.49 | 2.40 | 355 |
| B | CuCl$_2$ | — | 0.073 | — | 0.80 | 2.56 | 345 |
| C | CuI | — | 0.073 | — | 0.67 | 1.55 | 345 |
| D | Cu(II)AcAc | — | 0.073 | — | 0.83 | 2.65 | 355 |
| E | — | Na$_2$HPO$_3$ | — | 0.073 | 0.81 | 1.67 | 363 |
| 1 | CuCl$_2$ | Na$_2$HPO$_3$ | 0.073 | 0.073 | 1.14 | 1.40 | 365 |
| 2 | CuI | Na$_2$HPO$_3$ | 0.073 | 0.073 | 0.91 | 2.30 | 345 |
| 3 | Cu(II)AcAc | Na$_2$HPO$_3$ | 0.073 | 0.073 | 1.25 | 1.93 | 365 |
| 4 | CuCl$_2$ | Na$_2$HPO$_4$ | 0.073 | 0.073 | 0.90 | 2.10 | 345 |
| 5 | CuCl$_2$ | H$_3$PO$_3$ | 0.073 | 0.073 | gel | 5.30 | 315 |
| 6 | CuCl$_2$ | H$_3$PO$_3$ | 0.007 | 0.007 | 0.78 | 3.30 | 357 |
| 7 | CuCl$_2$ | MePO(OH)$_2$ | 0.073 | 0.073 | gel | 3.02 | 333 |
| 8 | CuCl$_2$ | (EtO)$_3$PO | 0.073 | 0.073 | 1.35 | 3.32 | 360 |
| 9 | Cu$_2$P$_2$O$_7$.3H$_2$O | — | 0.146 | — | 1.06 | >10.00 | 355 |
| 10 | CuSO$_4$ | — | 0.146 | — | 1.40 | 2.40 | 355 |
| 11 | CuSO$_4$ | — | 0.073 | — | 1.19 | 1.75 | N.D. |
| 12 | CuCl$_2$ | Na$_2$SO$_4$ | 0.073 | 0.073 | 0.94 | 2.70 | N.D. |
| 13 | Cu | — | 0.073 | — | 0.89 | 0.95 | 380 |
| 14 | Cu | Na$_2$HPO$_3$ | 0.073 | 0.073 | 0.70 | 1.41 | 375 |
| 17 | CuI | ZnSO$_4$ | 0.073 | 0.073 | 0.71 | 5.12 | 345 |

N.D. = Not Determined high molecular weight products having a nylon structure, i.e. the polyamide contains a plurality of amide linkages (—CONH—) as an integral part of the polymer backbone, as opposed to polyacrylamides which have an essentially all carbon backbone. These polyamides can be used in any application calling for the use of a nylon-type polymer. For example, these polyamides can be used as fibers, plastics, films and molding compounds.

This invention is particularly well adapted to manufacturing high quality nylon-6,6 polymer from adiponitrile, hexamethylene diamine, catalyst and water. However, this invention is also useful for the manufacture of nylon-4,4; nylon-6,4 and nylon-4,6 (from the appropriate dinitriles and diamines).

The following examples are illustrative of various embodiments of this invention. Unless noted to the contrary, all parts and percentages are by weight.

SPECIFIC EMBODIMENTS

Controls A–E and Examples 1–15

All the controls and examples were run in a Parr autoclave (450 ml) equipped with an anchor agitator. The reactor was charged with adiponitrile (54.07 g, 0.5 moles), hexamethylene diamine (58.15 g, 0.5004 moles), water (33.51 g) and catalyst. The reactor was then purged with nitrogen, sealed and connected to a back-pressure regulator adjusted to 750 psi absolute. The reaction mixture was then heated with stirring to 260° C. and the reaction was allowed to proceed at this temperature 3½ hours. The pressure within the reaction vessel was then reduced to atmospheric pressure over 30 minutes while the temperature was maintained at about 260° C. The reactor was then swept with nitrogen for 15 minutes and subsequently cooled to room temperature under a positive nitrogen pressure. Nylon-6,6 polymer was recovered from the reactor and ground to a size such that it would pass through a ten mesh (U.S.

An objective of the instant invention is a catalyst system which can maximize intrinsic viscosity, which is an indicator of molecular weight. As shown by the data in Table I, the combination of copper along with the oxygenated compounds, described herein gave better results than either compound when used alone.

Examples B, C, D and E with Examples 1, 2, and 3 demonstrate this quite clearly. In the controls marked as Examples B, C, D and E a copper compound catalyst or disodium phosphite catalyst were used alone. In Examples 1, 2, and 3 the same copper compounds were used in the presence of the phosphite. Intrinsic viscosities are much higher where the two components were used together.

Examples 4–8 show that other oxygenated phosphorous compounds in addition to disodium phosphite can be used in this reaction. Those containing free acidic protons are better at achieving high molecular weights, both alone and in combination with the copper compound, but the thermal stability of the resins produced are much poorer. There is no thermal stability problem with the copper compounds and neutral oxyphosphorous salts.

Thermal stability can be improved by lowering the catalyst concentration, but at the expense of molecular weight or reaction cycle time (Examples 10 and 11). Further, in Examples 9, 10 and 11 the copper and the oxygenated compound are the same compound.

Examples 10, 11, and 12 prove the effectiveness of sulfate as the anion in these reactions. In the first two the anion is in the same compound as the copper, while in the final example with sulfate a mixture of two compounds was employed, all with good results.

Examples 13, 14, and 15 show a loss of catalyst effectiveness when the catalyst is insoluble in the reaction mixture. Finely divided copper metal, which is insoluble, is not a preferred catalyst for this reaction, when used alone or in the presence of phosphite. Zinc sulfate is also highly insoluble, and is not a preferred source of sulfate ion for the reaction using $ZnSO_4$ with CuI as the catalyst.

Although the invention has been described in considerable detail through the preceding examples, these examples are for the purpose of illustration only and one skilled in the art will understand that variations and modifications can be made without departing from the spirit and scope of the invention.

The claimed invention is:

1. A process for manufacturing a polyamide comprising polymerizing an $\alpha,\omega$-dinitrile, an $\alpha,\omega$-diamine and water in contact with a catalyst, wherein the catalyst comprises (1) at least one of copper or a copper containing compound selected from the group consisting of copper halides, copper sulfates, copper borates, copper carbonates, copper nitrates and copper acetylacetonates, and (2) at least one oxygen containing compound of phosphorus or sulfur.

2. The process of claim 1, wherein the copper containing compound is a copper halide selected from the group consisting of $CuCl_2$, CuI and CuBr.

3. The process of claim 1, wherein the oxygen-containing compound of phosphorus is selected from the group consisting of phosphorous acid; phosphonic acid; alkyl or aryl substituted phosphonic acid; hypophosphorous acid; alkyl, aryl or alkyl/aryl substituted phosphinic acid; phosphoric acid; alkyl, aryl and alkyl/aryl esters of phosphorous acid, phosphonic acid, hypophosphorous acid or phosphoric acid; and metal salts, ammonium salts and ammonium alkyl salts of phosphorous acid, phosphonic acid, hypophosphorous acid or phosphoric acid.

4. The process of claim 3, wherein the catalyst includes an oxygen containing compound of phosphorous acid, phosphoric acid, or the sodium, lithium or sodium/lithium dibasic salts of phosphorous acid or phosphoric acid.

5. The process of claim 1, wherein the oxygen containing compound of sulfur is selected from the group consisting of sulfuric acid; sulfurous acid; sulfur dioxide; sulfur trioxide; alkyl or aryl substituted sulfonic acid; alkyl or aryl substituted sulfinic acid; alkyl and aryl substituted sulfenic acid; alkyl, aryl and alkyl/aryl esters of sulfuric acid, sulfonic acid, sulfinic acid or sulfenic acid; and metal salts, ammonium salts or ammonium alkyl salts of sulfuric acid, sulfonic acid, sulfinic acid or sulfenic acid.

6. The process of claim 5, wherein the catalyst includes an oxygen containing compound of sulfur selected from the group consisting of sulfuric acid, p-toluenesulfonic acid, and the sodium or lithium salts of sulfuric acid or p-toluenesulfonic acid.

7. The process of claim 1, wherein the catalyst includes an oxygen containing compound of sulfur selected from the group consisting of sulfoxides, sulfones, sulfates, pyrosulfates, sulfites, pyrosulfites, sulfonates and sulfinates.

8. The process of claim 1 wherein the catalyst is in an amount between 0.001 and 1.0 weight percent based on the total weight of dinitrile, diamine and water.

9. The process of claim 8 wherein the ratio of copper to the total amount of phosphorus and sulfur in the catalyst is between 20:1 and 1:20.

10. The process of claim 9 where the ratio of copper to the total amount of phosphorus and sulfur in the catalyst is between 1:1 and 1:10.

11. The process of claim 1, wherein the diamine is of the formula:

$$R'-HN-R-NHR'$$

and wherein the dinitrile is of the formula:

$$NC-R-CN$$

wherein each R is a divalent organic radical and each R' is independently hydrogen or a univalent organic radical.

12. The process of claim 11, wherein each R is independently $C_1$ to $C_{20}$ divalent aliphatic radical, a $C_5$ to $C_{18}$ divalent alicyclic radical or a $C_6$-$C_{12}$ divalent aromatic or aromatic containing radical and wherein each R' is independently hydrogen, a $C_1$ to $C_{20}$ univalent aliphatic radical, a $C_5$ to $C_7$ alicyclic radical or a phenyl radical.

13. The process of claim 12, wherein each R is independently a $C_2$ to $C_8$ straight chain divalent alkyl radical and each R' is hydrogen or a $C_1$ to $C_4$ radical.

14. The process of claim 11, wherein the diamine is hexamethylenediamine and wherein the dinitrile is adiponitrile.

15. A process for manufacturing a polyamide comprising polymerizing an $\alpha,\omega$-dinitrile, an $\alpha,\omega$-diamine and water in contact with a two component catalyst system comprising a mixture of (1) at least one copper containing compound and (2) at least one oxygen containing compound of phosphorus or sulfur.

* * * * *